United States Patent
Luker et al.

[11] 3,717,332
[45] Feb. 20, 1973

[54] CONTOUR CUTTING DEVICE

[75] Inventors: Ronald J. Luker, Hamilton, Ontario; George S. Jewell, Ancaster, Ontario, both of Canada

[73] Assignee: Air Products and Chemicals, Inc.

[22] Filed: Aug. 2, 1971

[21] Appl. No.: 167,991

Related U.S. Application Data

[62] Division of Ser. No. 881,528, Dec. 2, 1969.

[52] U.S. Cl. ............. 266/23 B, 266/23 E, 266/23 K
[51] Int. Cl. ................................................. B23k 7/00
[58] Field of Search ........ 266/23 R, 23 B, 23 E, 23 K, 266/23 L

[56] References Cited

UNITED STATES PATENTS 3,620,521   9/1972   Lundberg .................... 266/23 K

*Primary Examiner*—Gerald A. Dost
*Attorney*—Ronald B. Sherer et al.

[57] ABSTRACT

A contour cutting device where a torch or other cutting device is guided along a pattern followed by a photosensitive head wherein there is provided an improved means for maintaining parallel tracking of the main carriage in relation to the pattern support table. The machine is further characterized in that novel tool mounting devices, ready tool and tracing head access means, and tool spacing means are disclosed.

12 Claims, 9 Drawing Figures

PATENTED FEB 20 1973

INVENTORS
Ronald J. Luker
George S. Jewell

BY
James C. Simmons
ATTORNEY

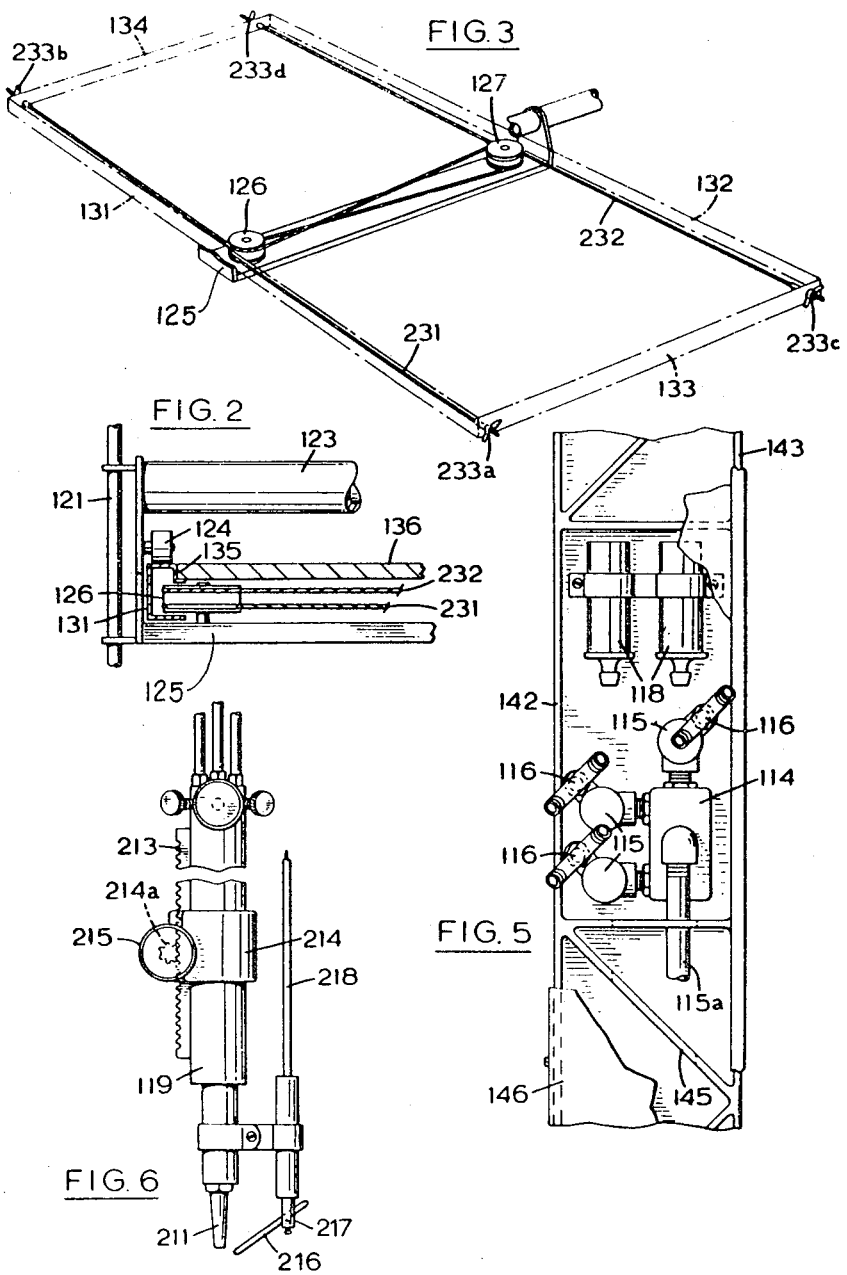

INVENTORS
Ronald J. Luker
George S. Jewell

BY James C. Simmons
ATTORNEY

CONTOUR CUTTING DEVICE

CROSS-REFERENCE TO RELATED APPLICATION

This application is a divisional application of copending application Ser. No. 881,528 filed Dec. 2, 1969.

BACKGROUND OF THE INVENTION

This invention pertains to contour cutting devices of the type disclosed in U.S. Pat. Nos. 3,423,081 and 3,559,971. As shown in the above patents, contour cutting devices operate by having a sensing head that follows a pattern drawn on a paper, the sensing head being fixed to a main carriage moveable in one direction with a transverse carriage mounted thereon for movement perpendicular thereto the entire assembly by compound movement resulting in a tool mounted on the transverse carriage reproducing on a workpiece the pattern followed by the sensing head.

In contour cutting devices it is absolutely necessary for the main carriage to move parallel to the rails that generally support such a carriage. Large machines such as disclosed by the prior art for cutting widths of 72 inches and greater are fabricated with rigid carriages to assure tracking and are chain driven for accuracy. For smaller machines, up to 55 inches wide effective cutting width, heavy rigid carriages are undesirable because of the inability to rapidly overcome momentum when changing direction, therefore decreasing accuracy of small pattern cuts. This can be offset by larger motors, brakes and the like but defeats the purpose of a small compact machine.

In addition, prior art machines have no ready access to the optical system or cutting tool surfaces. It is also desirable to be able to readily change the angular position of torch to the workpiece for making long straight (rip) cuts and the like.

SUMMARY OF THE INVENTION

Thus, in order to overcome the problems in prior art devices, according to the present invention, there is provided a compact pattern tracing machine having a tracking head assembly and a cutting tool assembly adapted for simultaneous motion therewith and means for supporting a pattern to be traced beneath said tracking head assembly and in a plane parallel to that within which said tracking and cutting head assemblies are free to move. The tracking head and tools are located upon a carriage assembly comprising a main carriage and a transverse carriage and the pattern to be traced is supported upon a table having first and second parallel sides, with means for locating the main carriage above said table in such manner that the tracking head is moveable along said parallel sides and is simultaneously restrained from rotational movement about an axis perpendicular to the table.

There is further provided means for rotating the transverse carriage about its longitudinal axis to position the cutting tools and sensing head in a plane parallel to the pattern tracing table for easy maintenance thereof.

Further features of the present invention reside in the tool mounting means so that each tool can be oriented in a rigid position horizontally or vertically to the workpiece and secondary locking means whereby each tool can be locked to the adjacent tools.

Therefore, it is the primary object of this invention to provide an improved contour cutting device.

It is a further object of the invention to provide a contour cutting device with improved tracking means for the main movable carriage.

It is yet another object of the present invention to provide a contour cutting device having means for readily moving the pattern follower and torches to a position for easy maintenance.

It is still another object of this invention to provide a contour cutting device having improved torch mounting and positioning means.

BRIEF DESCRIPTION OF THE DRAWING

FIG. 2 is a partial section on the line 2—2 of FIG. 1;

FIG. 3 is a diagrammatic perspective view of the underneath of the table and carriage assembly shown in FIG. 1;

FIG. 5 is a plan view of part of the beam shown in FIG. 1;

FIG. 6 is a front elevation of a torch shown in FIG. 1;

DESCRIPTION OF THE PREFERRED EMBODIMENT

Figures 1, 4:
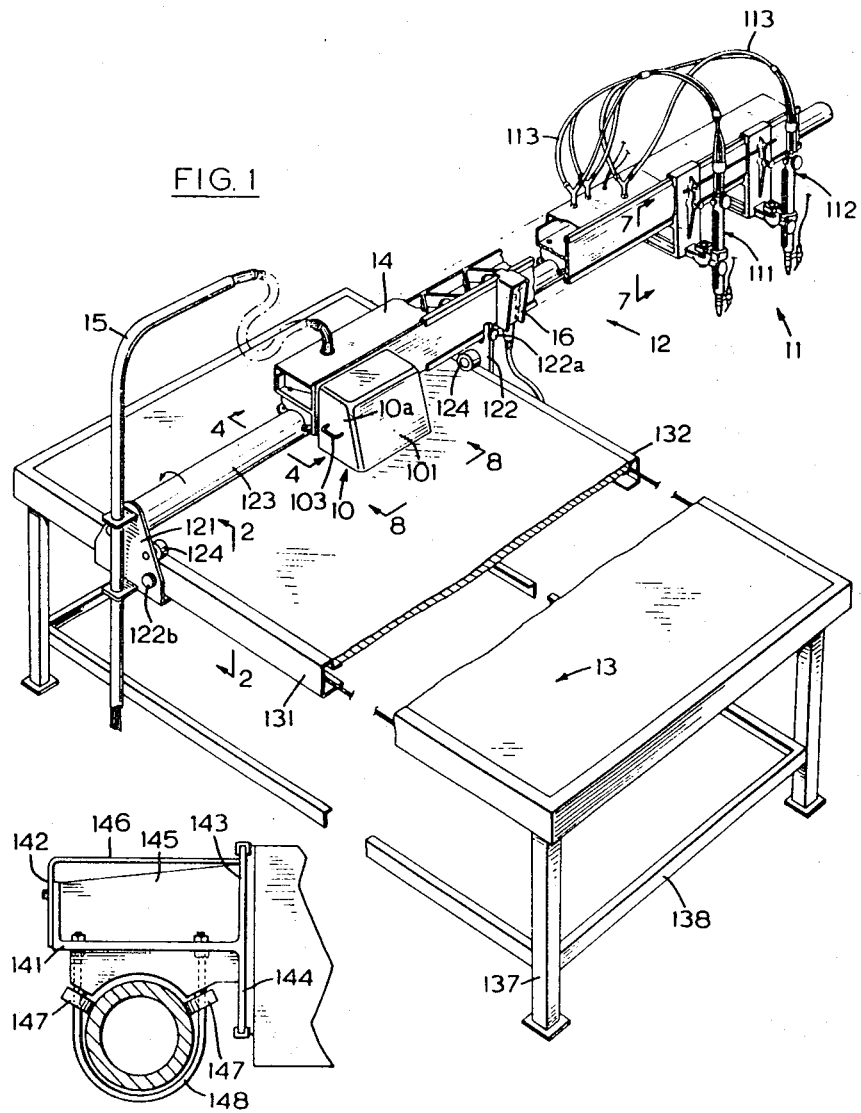
FIG. 1 is a perspective view of a pattern tracing machine according to the invention.
FIG. 4 (shown on the sheet containing FIG. 1) is a section on the line 4—4 of FIG. 1.

Referring now to the drawings, and particularly to FIG. 1 thereof, a pattern tracing machine according to the invention comprises a tracking (sensing) head 10, and a plurality of tools 11 mounted for simultaneous motion therewith upon a carriage assembly 12. The carriage assembly is disposed transversely of parallel sides 131 and 132 of a pattern supporting table 13, and is adapted for movement in a direction parallel to such parallel sides 131 and 132 of the table. The carriage assembly 12 comprises a lower main carriage 125 (FIG. 3) passing beneath the table 13 and an upper main carriage comprising a tubular boom 123 passing above said table. The upper and lower main carriages are connected by brackets 121 and 122 located at each end of the main carriage assembly and flanking the sides 131 and 132 of the table.

The upper main carriage boom 123 extends beyond the bracket 122 and outwardly of the table for a distance sufficient to accommodate the workpiece (not shown) from which the pattern is to be cut.

The head 10 and tools 11 are located upon a transverse carriage 14. The transverse carriage 14 is adapted for motion along the boom 123, the tracking head 10 being located above the table 13 and the tools 11 beyond the confines of said table.

The tools 11 can comprise oxy-fuel cutting torches 111 and 112 arranged in tandem so that two outlines may be cut out simultaneously and side-by-side. The torches are fed by gas lines 113. The gas lines pass along the beam 14 and are guided through a harness assembly 15, located upon the bracket 121. Sufficient play is provided in the gas lines between the harness and the beam to allow movement of the beam to its full extent towards and away from said harness. From the harness, the gas lines pass to a gas supply (not shown).

The various functions of the machine are controlled by means of the hand-held control 16.

Referring to FIGS. 2 and 3, the table comprises a rectangular metal frame comprising sides or rails 131 and 132 and ends 133 and 134. The frame is provided with a lip 135 at its inner periphery to receive a table top 136, constructed of for example, wood. The table is further provided with legs 137 and a lower reinforcing frame 138 (see FIG. 1).

The carriage assembly 12 is supported above the table 13 by means of rollers 124 extending from the inner surface of each bracket 121 and 122 and adapted to roll along the upper surfaces of the side members (rails) 131 and 132 of the table.

The lower main carriage 125 is provided at each end with double grooved pulleys 126 and 127, each pulley mounted for free rotation in a plane parallel to the plane of the table. The pulleys are of equal diameter and each pulley is located upon the upper surface of the lower carriage in such manner as to be radially spaced from the adjacent side 131 or 132 by approximately 1/16 inch. The two axes of the pulleys are further located upon a line normal to the sides 131 and 132.

The carriage assembly 12 is restrained from rotation relative to the sides 131 and 132 by means of tension cables 231 and 232. Each cable is attached at both extremities thereof to tension adjustment screws 233, located at each corner of the table frame. Cable 231 passes sequentially from screw 233a, around pulley 126, around pulley 127, and terminates in screw 233d. Similarly, cable 232 passes sequentially from screw 233c, around pulley 127, around pulley 126, and terminates in screw 233b. Thus, the cables form a generally H-configuration beneath the table 13, the web of the H being formed by the cables passing between the pulleys 126 and 127. By adjustment of the tension in each cable 231 and 232, the carriage assembly 12 may be accurately aligned in its operative position normal to sides 131 and 132 of the table, and the cable tension and configuration will serve to restrain such carriage from moving out of that position.

Locking screws 122a and 122b (FIG. 1) respectively are provided for locking the transverse carriage 14 to restrain movement along the boom 123 and for locking the carriage assembly to prevent movement thereof along the parallel sides of the table.

Referring now to FIGS. 4 and 5, the transverse carriage 14 comprises a channel member having a base 141 and sides 142 and 143 respectively. Side 143 is of greater height than side 142 and extends downwardly from the base 141 to form a flange 144. The carriage is provided with cross-webbing 145, and a flanged cover 146 extending the length of the carriage.

The transverse carriage 12 is supported for travel along the boom 123 by ball bearing rollers 147 (see FIG. 4). The bearings are oriented with their axes at 60° (each at 30° to perpendicular) in order to provide maximum support for the carriage whilst effectively restraining sideways movement of said carriage. At least two sets of bearings, as shown in FIG. 4, are provided; one such set between the tools and the end of the beam remote from the tracking head 10 and the other set close to the end of the beam adjacent the tracking head 10.

The carriage 14 is free to rotate through approximately 90° about the boom 123 so that the tracking head 10 and cutting tools 111, 112 may be exposed for maintenance. In order to maintain the carriage 14 captive upon the boom 123, U-brackets 148 (FIG. 4) are provided, each such bracket being located adjacent a pair of roller bearings 147.

The webbing 145 is discontinued over a portion of the beam adjacent cutting torch assembly 12 in order to accommodate control valves and ignition coils for the cutting torches 111 and 112. Each torch is provided with two oxygen supply lines and an acetylene supply line. For each torch, one oxygen line is to supply gas for normal cutting, and the remaining oxygen line is for pre-heat purposes. Solenoid actuated valves 115 are provided for pre-heat oxygen, cutting oxygen and acetylene flow control respectively, the three valves being located upon the junction box 114, for the solenoid wiring 115a (see FIG. 5).

A valve 115 is connected to each outlet of the box 114, each such joint having a Y-connector 116 attached thereto and extending vertically upwards with respect to the base 141 of the beam. To the branches of each Y-connector is attached tubing 113 which conveys the various gas flows to the torches 111 and 112. Ignition coils 118 are also provided in the beam for the purpose of lighting the torches 111 and 112 in a manner hereinafter to be described.

Figure 7:
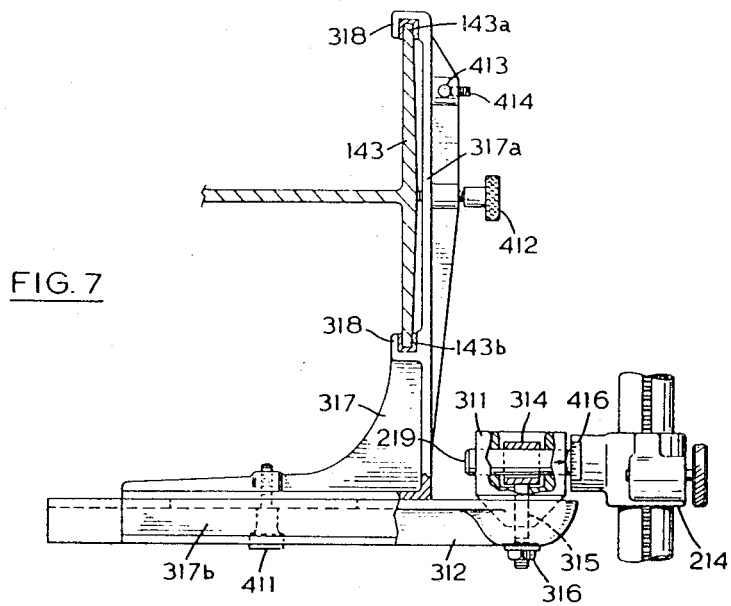
FIG. 7 is a section on the line 7—7 of FIG. 1.

Referring now to FIGS. 6 and 7, each cutting torch 111 and 112 is of conventional construction comprising a shaft 119 and a nozzle 211, the shaft being provided with manual gas control valves 212.

Ignition means are provided for each torch, said means comprising an electrode 216 movably located upon a support conductor 217 adjacent the torch nozzle 211. The electrode is connected through the support conductor and the ignition lead 218 to one side of the secondary of an ignition coil 118. The other connection to the secondary is effected through the metal of the torch assembly and beam. The electrode may be moved towards and away from the torch nozzle 211 in order to give the optimum spark for ignition.

The shaft of each torch is provided at its outer surface with a rack 213 extending longitudinally of the shaft. Each torch passes through and is supported by a bracket 214 provided with a pinion 214a which engages the rack 213. The pinion is rotatably keyed to a control wheel 215 whereby the pinion may be turned to raise and lower the cutting torch.

The bracket 214 (FIG. 7) is provided at its surface remote from the wheel 215 with an outwardly extending shaft 219, the axis of such shaft being normal to and intersecting the longitudinal axis of the cutting torch. The shaft 219 is journalled in a block 311 of generally cubic configuration located at one end of a channel member 312. The portion of the block which contacts the channel member 312 is tapered to a frusto-pyramid, and a cup is formed in the member 312 to receive such tapered portion of the block. A collar 314 is formed around the shaft 219 within the block 311, such collar having a threaded shaft 315 extending outwardly from its periphery. The threaded shaft passes through the tapered portion of the block and the cup, and is held captive by a nut 316. Tightening of the nut 316 pulls the collar 314 into contact with the shaft 219, thus frictionally restraining rotation of the shaft. The torch may therefore be rotated through 90° by lifting, turning, and dropping the block back into the cup and may then be tilted to any desired angle about the shaft 219, and locked in position by tightening the nut 316. The tilt angle is read off on a scale 416 located upon the bracket 214 adjacent the block 311.

The channel member 312 is supported by an L-bracket 317 which rides along the side 143 of the carriage 14. The bracket 317 is flanged as at 318 upon the inner surface of one of its limbs 317a and the other limb 317b is channelled. The channelled limb is adapted to slidably receive the channel member 312, which is held captive to the L-bracket by a screw 411. The screw 411 passes through a slot in the channel member and is in threaded engagement with the L-bracket. The slot is formed longitudinally in the channel member 312 so that slackening off of the screw 411 allows the member 312 to slide in the channelled limb 319 over a distance determined by the length of the slot. Tightening of the screw 411 rigidly locates the member 312 against the limb 317a of bracket 317. Thus, the distance of each cutting torch from the carriage 14 may be varied and set as required.

As stated above, the bracket 317 rides along the side 143 of the carriage 14. Each flange 318 accommodates an edge 143a and 143b respectively of bracket 317, and the bracket is therefore slidably located upon the beam. The bracket 317 may be locked at any point of its travel by means of a locking screw 412 which may be tightened to frictionally engage the side member 143.

The brackets 317 are interconnected for simultaneous motion along the beam by means of a connecting bar 413 passing through a projection upon the outer surface of each bracket limb 317a. The bar is locked in position upon each bracket by means of a grub screw 414, thereby permitting the spacing of the brackets to be preset, if required.

The tracking head 10 is housed in a metal box 101, supported by the transverse carriage 14 (see FIG. 1). The box has opposite ends 10a of truncated right triangle shape, the remaining surfaces of the box being rectangular. The box is rigidly located upon the transverse carriage 14 and abuts the side 143 of the carriage 14. A handle 103 is provided to enable the box and thus the carriage 14 and cutting tools 11 to be pivoted about the boom 123 in the direction shown by the arrow in FIG. 1. A tip switch (not shown) is also provided to automatically disengage the gas ignition system when the beam and head assemblies are tilted for maintenance, in order to prevent accidental ignition of the torches.

Figure 8:
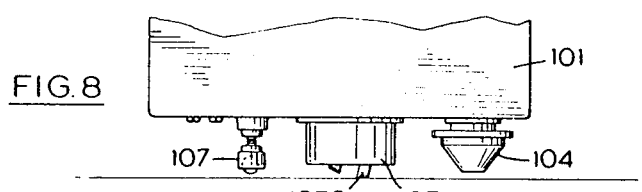
FIG. 8 is a front elevation of the lower portion of the tracking head shown in FIG. 1, shown on the line 8—8 of FIG. 1.

Referring now to FIG. 8, the tracking head is provided with an optical line follower 104 and a drive means for the head 105.

The line follower 104 is described in detail in Canadian Pat. No. 751,072, dated Jan. 17, 1967. Briefly, the line follower comprises two photocells and a light source. The cells are mounted side by side and adapted to sense light which is beamed from the light source onto the pattern being traced and reflected back to the cells. In operation, the cells are located immediately above and symmetrically straddle the line being traced, so that the same amount of light is reflected from either side of the line to each cell. In this condition, since there is no differential between the light sensed by the cells, the electrical outputs of the cells are the same. If the follower begins to deviate from the line being traced, a differential appears between the electrical outputs of the cells, and this differential is employed to activate a steering mechanism associated with the drive means 105. The follower is thereby automatically guided back to its mean position above the line being traced.

The drive means 105 and the steering mechanism associated therewith is described in greater detail in Canadian Pat. No. 772,895, dated Dec. 5, 1967.

The tracking head is also provided with a lift mechanism 107, by means of which the drive means 105 may be raised from the pattern. This allows the tracking head to be moved manually in any direction across the pattern so that the follower 104 may be positioned at any desired point above the pattern.

Figure 9:
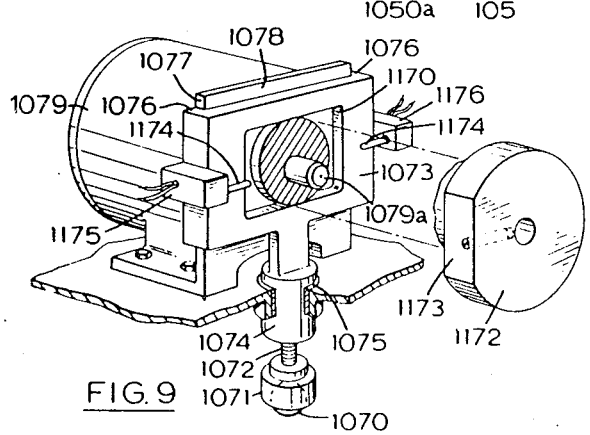
FIG. 9 is a perspective view of a lift device for the tracking head shown in FIG. 1.

Referring now to FIG. 9, the lift mechanism comprises a ball bearing caster 1070 located for free rotation in any plane within a socket 1071. The socket is located at one end of a stub shaft 1072, which shaft is attached to a rectangular slide member 1073. Attachment of the shaft 1072 to the slide member 1073 is effected by means of a tubular extension 1074 at the median of one longer side of the rectangular slide member and extending outwardly of said slide member. The extension is provided with a bore coaxially thereof wherein the shaft 1072 is threaded with its axis in the plane of the rectangular slide member 1073. It may further be noted that the axis of the shaft is in line with the center of the ball bearing caster 1070 so that the caster, shaft, and slide assembly may be said to be symmetrical and thereby balanced about the axis of the shaft 1072.

The tubular extension 1074 passes through and is slidable within an orifice 1075 in the base of the box 101. The shorter edges of the slide member 1073, which move in the direction of movement of the tubular extension 1074 within the orifice 1075, are provided with flanges 1076 which contact and are slidable along the parallel edges 1077 of a rectangular support member 1078 extending vertically upwards from the base of the box 101.

On the face of the support member 1078 remote from the slide member 1073 there is located an electric motor 1079, the output shaft 1079a of which passes freely through the member 1078 in a direction substantially normal to the plane thereof. The slide member 1073 is provided with a rectangular cut-out 1170, the edges of which are substantially parallel to those of the slide member. The cut-out receives a cam 1171, located upon the shaft of the motor 1079 in such manner that rotation of the shaft causes sliding motion of the slide member 1073. The throw of the cam is chosen so that rotation of the motor shaft through 180° moves the lift mechanism from its fully extended to its fully retracted position, or vice versa. The shaft is further provided outwardly of the cam 1171 with a disc 1172, said disc having a flat 1173 at a portion of its circumference. In the embodiment shown herein, the disc and cam are formed as an integral unit.

The flat is adapted to engage actuating arms 1174 of contacts 1175 and 1176 respectively for a purpose hereinafter to be described.

It is apparent that other modifications can be made to the described preferred embodiment without departing from the spirit and scope of the invention including additional cutting tools or torches mounted on the transverse carriage.

Having thus described our invention what we desire to secure by Letters Patent of the United States is set forth in the following claims.

We claim:

1. In a contour cutting device having a main carriage mounted on generally parallel supporting members for movement on a first axis generally parallel to said supporting members, a transverse carriage mounted on said main carriage for movement transversely of the main carriage, said transverse carriage adapted to position and support a plurality of cutting tools, and a combination tracing and driving head for moving said contour cutting device along a preselected pattern, the improvement comprising:

a second main carriage member rigidly secured to and spaced apart from said main carriage, said second main carriage member aligned in parallel relation to said main carriage;

pulley means near the outer ends of said second main carriage member;

at least two continuous filaments, the first end of each fastened to diagonally opposite ends of each parallel supporting member, then extending in a direction substantially parallel to the respective supporting member to the closest pulley means, passing around the pulley means to the opposite pulley means then passing therearound and extending in a substantially parallel direction along the opposite parallel supporting member to the end thereof where a second end of each filament is attached, the point of attachment of the second end of each filament being diagonally opposite from the point of attachment of the first end of each respective filament.

2. A contour cutting device according to claim 1 wherein each filament includes adjacent one end thereof means to adjust the tension in the filament.

3. A contour cutting device according to claim 1 wherein the means securing said main carriage to said second main carriage includes roller means for moving said carriage along said parallel support means.

4. In a contour cutting device having a main carriage mounted on generally parallel supporting members for movement on a first axis generally parallel to said supporting members; a transverse carriage mounted on said main carriage for movement transversely of the main carriage, said transverse carriage adapted to position and support a plurality of tools in a generally vertical position, and a combination pattern following and driving head on said transverse carriage for moving said contour cutting device along a pattern disposed beneath said pattern following and driving head, the improvement comprising:

mounting said transverse carriage on said main carriage so that said transverse carriage can be rotated about its longitudinal axis thereby being able to position the underside of the tools and combination pattern following and driving head in a plane vertical to the plane of operation of the contour cutting device.

5. A contour cutting device according to claim 4 wherein there is included means to lock said transverse carriage to prevent rotation thereof.

6. A contour cutting device according to claim 5 wherein the transverse carriage is slidably mounted on an elongated boom having a generally circular cross-section said boom comprising the primary structural element of the main carriage.

7. A contour cutting device according to claim 4 wherein said tools are carried by a member slidably and lockably fastened to said transverse carriage whereby said tools can be readily positioned at varying horizontal distances from said transverse carriage.

8. A contour cutting device according to claim 4 wherein said tools are carried on said transverse carriage by compound swivel coupling means so that said tools can be oriented at an angle to the vertical and horizontal axis of the transverse carriage.

9. A contour cutting device according to claim 8 wherein said compound swivel coupling includes a shaft rotatably mounted in a bearing block said bearing block having a generally frusto-conical surface for insertion into a cup-shaped receiving member on said carriage.

10. A contour cutting device according to claim 9 wherein said block includes a single locking means for locking both said shaft to said block and said block to said cup.

11. A contour cutting device according to claim 4 wherein said cutting tools are disposed on said transverse carriage by means of brackets, said brackets having locking means therebetween for spacing said tools one from the other along said transverse carriage.

12. A contour cutting device according to claim 11 including means so said tools may be positioned along said carriage in a predetermined, spaced relationship by locking the tool holders together.

* * * * *